US011146640B2

(12) United States Patent
Rath et al.

(10) Patent No.: US 11,146,640 B2
(45) Date of Patent: Oct. 12, 2021

(54) SYSTEM AND METHOD FOR ENABLING INTELLIGENT NETWORK SERVICES BY COGNITIVE SENSE-ANALYZE-DECIDE-RESPOND FRAMEWORK

(71) Applicant: Tata Consultancy Services Limited, Mumbai (IN)

(72) Inventors: Hemant Kumar Rath, Bhubaneswar (IN); Shameemraj Mohinuddin Nadaf, Bangalore (IN); Bighnaraj Panigrahi, Bangalore (IN); Jyotirmoy Karjee, Bangalore (IN); Samar Shailendra, Bangalore (IN); Abhijan Bhattacharyya, Kolkata (IN); Garima Mishra, Bangalore (IN); Arpan Pal, Kolkata (IN); Balamurlidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/566,365

(22) Filed: Sep. 10, 2019

(65) Prior Publication Data

US 2020/0084279 A1   Mar. 12, 2020

(30) Foreign Application Priority Data

Sep. 10, 2018  (IN) .............................. 201821034028

(51) Int. Cl.
*H04L 29/08* (2006.01)
(52) U.S. Cl.
CPC ................................. *H04L 67/125* (2013.01)
(58) Field of Classification Search
CPC ..... H04L 67/125; H04L 43/028; H04L 43/08; H04L 41/147; H04W 4/70
See application file for complete search history.

(56) References Cited

U.S. PATENT DOCUMENTS

| 10,305,758 B1* | 5/2019 | Bhide ................... H04L 41/147 |
| 2010/0131799 A1* | 5/2010 | Wu ..................... G05B 23/0278 714/26 |

(Continued)

FOREIGN PATENT DOCUMENTS

CA         3032323           2/2018

OTHER PUBLICATIONS

Jahromi, H.Z. et al. "Towards Application-Aware Networking: ML-based End-to-End Application KPI/QoE Metrics Characterization in SDN," *2018 Tenth International Conference on Ubiquitous and Future Networks (ICUFN)*, Jul. 3-6, 2018; 7 pages.

*Primary Examiner* — David R Lazaro
(74) *Attorney, Agent, or Firm* — Finnegan, Henderson, Farabow, Garrett & Dunner, LLP

(57) ABSTRACT

In the field of Internet of Things understanding need of applications and translating them to network parameters and protocol parameters is a major challenge. This disclosure addresses problem of enabling network services by cognitive sense-analyze-decide-respond framework. A processor implemented method is provided for enabling network aware applications and applications aware networks by a sense analyze decide respond (SADR) framework. The processor implemented method includes sensing, at least one application parameter and at least one network parameter to obtain a plurality of sensed information; analyzing, the plurality of sensed information is filtered and synchronized to generate a plurality of derived parameters; determining, a plurality of rules based on the plurality of derived parameters; validating, the plurality of rules for a plurality of scenarios to obtain plurality of decisions; and enabling, at least one of (i) network, (ii) application and (iii) protocol control based on the plurality of decisions.

8 Claims, 11 Drawing Sheets

(56) References Cited

U.S. PATENT DOCUMENTS

| | | | | |
|---|---|---|---|---|
| 2011/0314145 A1* | 12/2011 | Raleigh | ............... | H04L 41/0893 |
| | | | | 709/224 |
| 2013/0010610 A1* | 1/2013 | Karthikeyan | ........... | H04L 41/16 |
| | | | | 370/242 |
| 2013/0185591 A1* | 7/2013 | Ge | ...................... | G06F 11/0709 |
| | | | | 714/26 |
| 2016/0080248 A1* | 3/2016 | Rijnders | ............. | H04L 41/5009 |
| | | | | 709/224 |
| 2016/0269417 A1* | 9/2016 | Saxena | ................... | H04L 63/06 |
| 2017/0091663 A1 | 3/2017 | Sanchez et al. | | |
| 2017/0093924 A1* | 3/2017 | Loo | .................. | H04L 29/06986 |
| 2017/0325120 A1* | 11/2017 | Szilagyi | ............. | H04L 41/5067 |
| 2017/0353361 A1* | 12/2017 | Chopra | .................. | H04L 43/00 |
| 2017/0359749 A1* | 12/2017 | Dao | .................... | H04L 47/2416 |
| 2019/0014024 A1* | 1/2019 | Koshy | ..................... | H04L 43/08 |
| 2019/0171187 A1* | 6/2019 | Cella | ................. | G05B 23/0221 |
| 2019/0238450 A1 | 8/2019 | Michael et al. | | |
| 2020/0084279 A1* | 3/2020 | Rath | .................... | H04L 41/147 |
| 2020/0106714 A1* | 4/2020 | Cote | .................. | H04L 41/0816 |
| 2020/0119992 A1* | 4/2020 | Yan | ........................ | H04L 43/16 |

\* cited by examiner

SYSTEM AND METHOD FOR ENABLING INTELLIGENT NETWORK SERVICES BY COGNITIVE SENSE-ANALYZE-DECIDE-RESPOND FRAMEWORK

PRIORITY CLAIM

This U.S. patent application claims priority under 35 U.S.C. § 119 to: India Application No. 201821034028, filed on Sep. 10, 2018. The entire contents of the aforementioned application are incorporated herein by reference.

TECHNICAL FIELD

This disclosure relates generally relates to Internet of Things, and, more particularly, to system and method for enabling intelligent network services by cognitive sense-analyze-decide-respond framework.

BACKGROUND

In an Industry 4.0 scenario, there are many applications involving various Internet of Things (IoT) devices such as sensors, gateways, robots, Automated Guided Vehicles (AGVs), drones, etc. These applications demand high throughput, low latency and high reliability. Understanding the need of the applications and translating them to the network parameters and the protocol parameters is a major challenge. The IoT devices used here are many in number, often use different networking/communication technologies such as Wi-Fi (Wireless Fidelity), Bluetooth, LTE (Long Term Evolution), LAA (Licensed Assisted Access), etc., and generate moderate to huge amount of data traffic which needs to be communicated to a central node or the cloud for processing. Providing a reliable, stable, cost-effective and easy to manage network solution based on the demand of these applications, availability of the devices and networks and capability of the protocols deployed, remains a major challenge.

Dynamic optimal decision making to ensure high Quality of Experience (QoE) to the applications with the constraints of the network is a key challenge. In such scenarios, decision rules depend upon multiple parameters (application, network, link, energy, protocol, etc.) and hence a straight away decision is not possible. Apart from this, responding to the changes of the network/application/protocol, etc., at the right time with the appropriate framework becomes crucial. Moreover the framework should also be agnostic to the applications, devices, protocols and networking technology. The existing solutions today mostly either managing devices or the applications or the technology independently, i.e., in SILOs.

SUMMARY

Embodiments of the present disclosure present technological improvements as solutions to one or more of the above-mentioned technical problems recognized by the inventors in conventional systems. For example, in one embodiment, a method for enabling network aware applications and applications aware networks by a sense analyze decide respond (SADR) framework is provided. The processor implemented method includes sensing, via one or more hardware processors, at least one application parameter and at least one network parameter to obtain a plurality of sensed information; analyzing, via the one or more hardware processors, the plurality of sensed information being filtered and synchronized to generate a plurality of derived parameters; determining, via the one or more hardware processors, a plurality of rules based on the plurality of derived parameters; validating, via the one or more hardware processors, the plurality of rules for a plurality of scenarios to obtain a plurality of decisions; and enabling, via the one or more hardware processors, at least one of (i) a network, (ii) an application and (iii) a protocol control based on the plurality of decisions. The plurality of sensed information is a multi-time scaled data set obtained for a plurality of use cases. The plurality of decisions correspond to a real-time decision or an off-line decision.

In an embodiment, the at least one application parameter may corresponds to at least one of: (i) a plurality of Quality of Service (QOS) parameters, and (ii) a plurality of Key Performance Index (KPI) parameters. In an embodiment, the at least one network parameter may corresponds to at least one of (i) bandwidth availability and usage, (ii) a plurality of delay characteristics, (iii) a port availability at a switch, (iv) an end-to-end network availability, (v) a signal to interference and noise ratio (SINR) or received signal strength indicator (RSSI), and (vi) a plurality of protocol related parameters. In an embodiment, further include predicting subsequent state of the networks and the applications based on a current sensed data.

In another aspect, a sense analyze decide respond (SADR) system with a cognitive platform to enable network aware applications and applications aware networks is provided. The system comprises a memory storing instructions; one or more communication interfaces; and one or more hardware processors coupled to the memory via the one or more communication interfaces, wherein the one or more hardware processors are configured by the instructions to: sense, at least one application parameter and at least one network parameter to obtain a plurality of sensed information; analyze, the plurality of sensed information being filtered and synchronized to generate a plurality of derived parameters; determine, a plurality of rules based on the plurality of derived parameters; validate, the plurality of rules for a plurality of scenarios to obtain a plurality of decisions; and enable, at least one of (i) a network, (ii) an application and (iii) a protocol control based on the plurality of decisions. The plurality of sensed information is a multi-time scaled data set obtained for a plurality of use cases. The plurality of decisions correspond to a real-time decision or an off-line decision.

In an embodiment, the at least one application parameter may corresponds to at least one of: (i) a plurality of Quality of Service (QOS) parameters, and (ii) a plurality of Key Performance Index (KPI) parameters. In an embodiment, the at least one network parameter may corresponds to at least one of (i) bandwidth availability and usage, (ii) a plurality of delay characteristics, (iii) a port availability at a switch, (iv) an end-to-end network availability, (v) a signal to interference and noise ratio (SINR) or received signal strength indicator (RSSI), and (vi) a plurality of protocol related parameters. In an embodiment, the one or more hardware processors are further configured by the instructions to predict subsequent state of the networks and the applications based on a current sensed data.

In yet another aspect, there are provided one or more non-transitory machine readable information storage mediums comprising one or more instructions which when executed by one or more hardware processors causes at least one of: sensing, via one or more hardware processors, at least one application parameter and at least one network parameter to obtain a plurality of sensed information; analyzing, via the one or more hardware processors, the plurality of sensed information being filtered and synchronized to generate a plurality of derived parameters; determining, via the one or more hardware processors, a plurality of rules based on the plurality of derived parameters; validating, via the one or more hardware processors, the plurality of rules for a plurality of scenarios to obtain a plurality of decisions; and enabling, via the one or more hardware processors, at least one of (i) a network, (ii) an application and (iii) a protocol control based on the plurality of decisions. The plurality of sensed information is a multi-time scaled data set obtained for a plurality of use cases. The plurality of decisions correspond to a real-time decision or an off-line decision.

In an embodiment, the at least one application parameter may corresponds to at least one of: (i) a plurality of Quality of Service (QOS) parameters, and (ii) a plurality of Key Performance Index (KPI) parameters. In an embodiment, the at least one network parameter may corresponds to at least one of (i) bandwidth availability and usage, (ii) a plurality of delay characteristics, (iii) a port availability at a switch, (iv) an end-to-end network availability, (v) a signal to interference and noise ratio (SINR) or received signal strength indicator (RSSI), and (vi) a plurality of protocol related parameters. In an embodiment, further include predicting subsequent state of the networks and the applications based on a current sensed data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
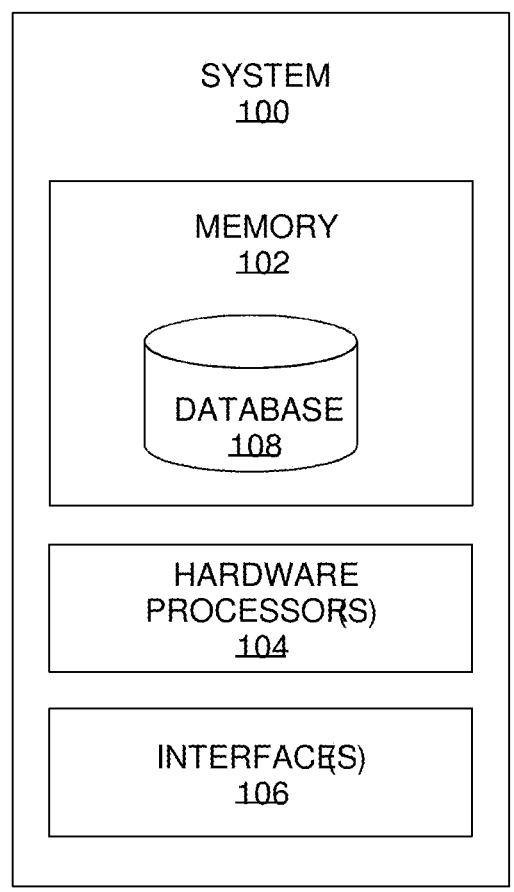
FIG. 1A illustrates a functional block diagram of a Sense Analyze Decide Respond (SADR) framework according to embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments of the present disclosure provides a Sense Analyze Decide Respond (SADR) framework which is a cognitive platform configured to provide application aware networking and network aware applications. The cognitive platform include a sense module, a analyze module, a decide module, and a respond module. The each module includes set of services which can be deployed through at least one of cloud platform, desktop systems, and similar systems. The sense module is configured to sense application parameters such as Quality of Service (QOS) parameters (e.g., delay, throughput, packet drop, etc.,), Key Performance Index (KPI) parameters (e.g., network availability, network usage, delay limit, reliability, accessibility), and network parameters such as a bandwidth availability and usage, delay characteristics, port availability at a switch, end-to-end network availability, signal to interference and noise ratio (SINR) or received signal strength indicator (RSSI), protocol related parameters, etc. The sense services can also be specific to one or more network types (Wi-Fi, WLAN, LAN, 5G etc.,) and one or more applications (e.g., video, audio, browsing). The sense services are utilized to collect information related to network and application and the information collected are analyzed through an analysis module.

The analyze module includes a set of services to analyze the sensed information. The embodiments of the present disclosure in which the set of services include throughput analysis, SINR or RSSI analysis, load analysis, application type, application usage, packet drop, packet delay, through various learning or Machine Learning services, etc. A decide module includes a set of services and provides real-time decisions or off-line decisions. The set of services include both static and dynamic rule based decisions. The decide module also includes artificial intelligence (AI) based services such that new rules can be framed and new decisions can be taken depending upon need of the services. The embodiments of the present disclosure in which formulation of new rules, an emulator or simulator can be used with a model validator. The decide module acts like a brain of the platform. A respond module includes a set of services which include dynamic network provisioning commands, network device configuration, network setting rules such as firewall rules or routing rules, priority rules, etc. The services used in the respond module can interact with one or more applications to such that application parameters such as coding scheme, end-to-end compression type, type and quality of data to be communicated through the applications, etc can be configured.

Referring now to the drawings, and more particularly to FIGS. 1A through 9, where similar reference characters denote corresponding features consistently throughout the figures, there are shown preferred embodiments and these embodiments are described in the context of the following exemplary system and/or method.

FIG. 1A illustrates a functional block diagram of a Sense Analyze Decide Respond (SADR) framework according to embodiments of the present disclosure. The system 100 includes or is otherwise in communication with one or more hardware processors such as a processor 106, an I/O interface 104, at least one memory such as a memory 102, and the memory 102 further includes a knowledge graph learning module 108. In an embodiment, the knowledge graph learning module 108 can be implemented as a standalone unit in the system 100. In another embodiment, the knowledge graph learning module 108 can be implemented as a module in the memory 102. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The I/O interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

The repository, amongst other things, includes a system database and other data. The other data may include data generated as a result of the execution of one or more modules in the plurality of modules.

Figure 1B:
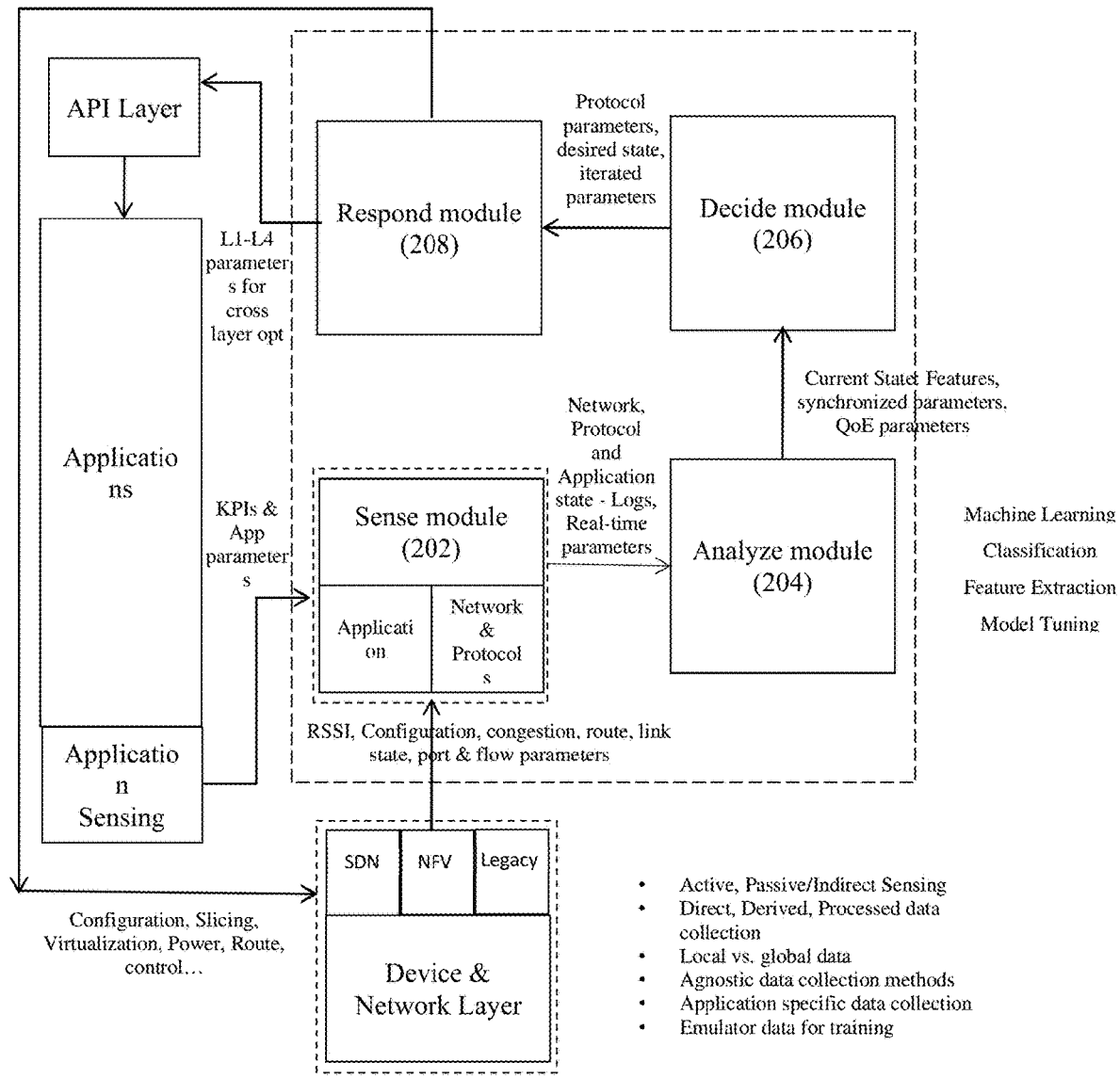
FIGS. 1B and 1C illustrates an exemplary functional block diagram of the Sense Analyze Decide Respond (SADR) framework according to embodiments of the present disclosure.
Figure 1C:
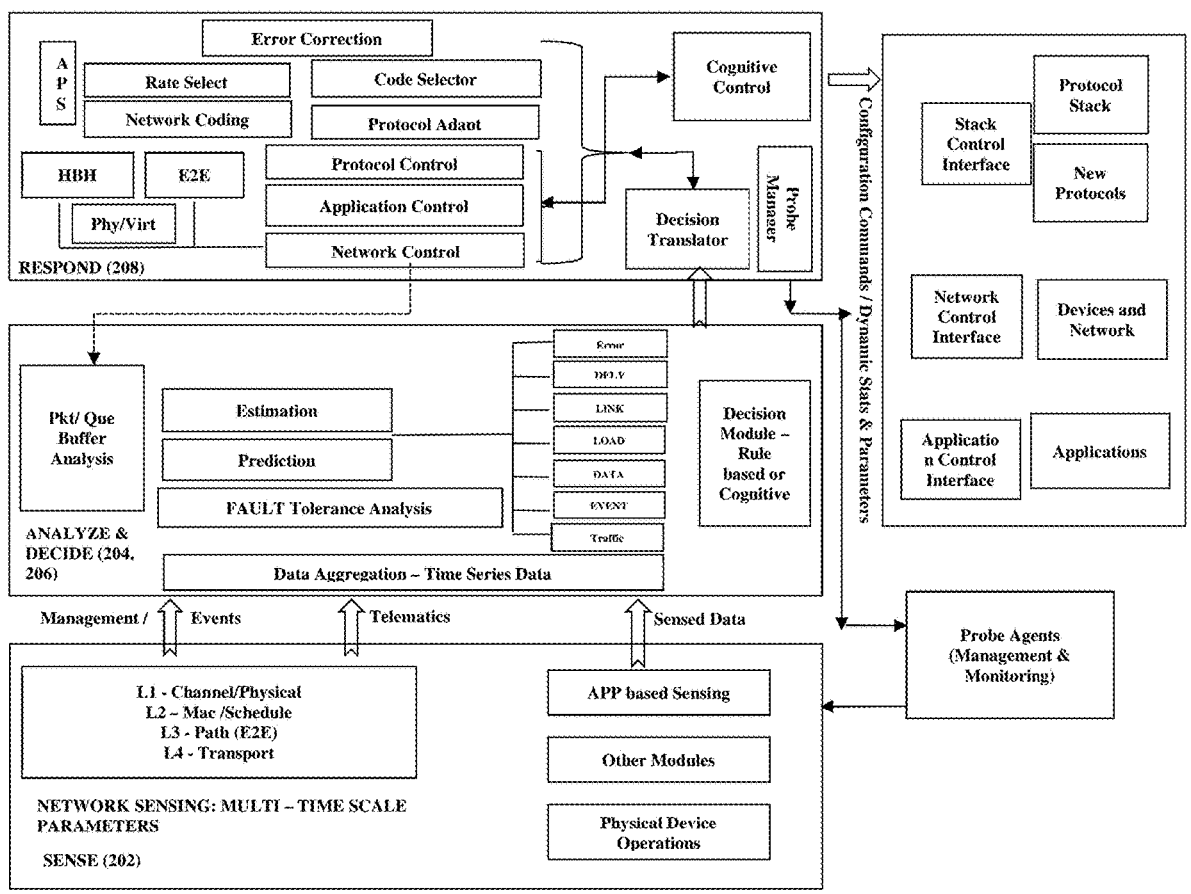

FIGS. 1B and 1C illustrates an exemplary functional block diagram of the Sense Analyze Decide Respond (SADR) framework according to embodiments of the present disclosure. The SADR framework is a cognitive architecture with SDNized control of the applications and networking, (a) Fine/coarse control of the network parameters, (b) self-healing solution for network and applications. In an embodiment, the SADR framework proposes generic interfaces (for networks and applications separately). These interfaces utilize concept of a Software Defined Networks (SDN) methodologies (e.g., SDNization) such that seamless support of network and application technologies is achieved. The SADR framework comprises a sense module 202, an analyze module 204, a decide module 206, and a respond module 208.

The SADR framework involves following steps: (a) sense through probe agents e.g., application, network, devices and the protocols; (b) analyze the data collected to take appropriate decisions e.g., on-line and off-line analysis; (c) appropriate decisions are taken for adapting to the situation and future need; and (d) appropriate measures are taken through a response framework: e.g., cross-layer solutions for network control based on application and other information, application control based on network and other information and protocol control based on network, application and other information. The sense module 202 is configured for network, application and device data sensing, intelligent data aggregation, data prediction and estimation. The analyze module 204 generates events based on analysis, multi-time-scale data analysis and synchronization. The analyze module 204 is configured with machine learning or learning modules to understand the sensed data appropriately. The decide module 206 is configured with artificial intelligence modules to decide future data sensing, analysis and response; and network emulation and planning are integrated. The respond module 208 is configured for responding in terms of provisioning the network, protocol and the applications.

The sense module 202 is configured to sense networks, links, applications, protocols. The sense module 202 is further configured to decide frequency of sensing and predicting future state based on the current sensed data through the analyze module 204. In an embodiment, parameters such as load on a link, network, end-to-end delay, Packet error rate, interference in the link, maximum capacity of a link, traffic types, queue size, transmit power, etc., are sensed. The sense module 202 interacts closely with other modules and selection of sensing type can be decided as required.

In one embodiment, the sensed data are in general multi-time scale in nature. For example, Signal to Interference and Noise Ratio (SINR) changes in milliseconds, whereas application throughput changes in seconds. In an embodiment, the sense module 202 comprises a plurality of sensing types, (a) active, passive/indirect sensing i.e., through direct methods or from log-files, and (b) direct, derived, processed data collection i.e., (i) the SINR is a derived parameter, where instantaneous throughput is a direct parameter, and (ii) Latency is a process parameter.

The sense module 202 is configured to sense for network and devices wherein network can be virtual, legacy, Information Centric Networking (ICN) and Software Defined Networks (SDN) type, and devices can be both control (telematics) and data (designated information to be sent/received) are to be sensed. Similarly, the sense module 202 senses application i.e., methods to understand one or more applications and generate scores which can be used for analysis and decision making and Key Performance Indicators (KPIs) and application parameters to be sensed (KPIs can be standardized or solution specific). The sense module 202 is configured with probe agents i.e. to be deployed via middle layer.

The analyze module 204 analyzes the sensed data using generic learning or Machine Learning algorithms i.e., data specific analysis, and generalized analysis. The analyze module 204 analyzes multi-time scaled data to be synchronized to generate a plurality of derived parameters. In an embodiment, the plurality of derived parameters corresponds to statistics of the at least one application parameter and the at least one network parameter. The analyze module 204 analyzes multi-dimensional data analysis. In an embodiment, the analysis can be performed through a middle layer placed logically between the network including the controller and the application. In an embodiment, analysis of the sensed data and mapping of the analyzed data for multi-dimensional classification required for network state and Quality of Services (QoS) mapping.

For Example: Latency (L), Throughput (T) and Reliability (R) are the key performance indicator for which data has to be analyzed and mapped i.e., different values of LTR and with multiple permutations and combinations of "LTR" to define state of the network. The analyze module 204 comprises key tasks that are as follows: (i) Machine Learning of the direct, synthetic and predicted data; (ii) Classification (Multi-dimensional classification); (iii) Feature Extraction on single and/or multiple parameters; and (iv) Model Tuning i.e., Tuning based on learning of observed data. The analyze module 204 further comprises (a) Packet/Queue analysis through simulation e.g., Black box testing, emulation/simulation, (b) analysis—Prediction & Estimation, and (c) data aggregation and time series analysis.

The decide module 206 provides rule based or cognitive decisions which comprise: (a) Optimal vs. sub-optimal solution; (b) Use case analysis is required i.e., use of extended emulation/simulation module to recreate the scenario and to form the rule or models; (c) These rules (or models) are to be trained further and appropriate emulation based testing is required for validation; (d) any decision to be deployed (as a part of respond framework) can be validated in the emulator: (i) along with the observed data (sensed data), synthetic data generated by the emulation are used for modeling, training and decision making.

The decide module 206 is configured with following functionalities:
 (a) Step by Step Approach
  i. Uses time-series analysis of the sensed data and multi-dimensional fuzzy classification of network state and emulated network mapping to improve the Quality of Experience (QoE) of the applications, and
  ii. Decision rules are formulated as the output of the joint emulated system of applications, protocols and networks and the observed QoS parameters.
 (b) Prediction and Estimation
  i. To-be-state of the network, protocol and application can be made available with the use of analyzed data and emulated data/model. For Example: Latency, Throughput and Reliability of the system/network can be predicted based on historical and emulated data.
 (c) Protocol adaption
  i. Decision module is also used for the parameter tuning of the protocols to be used.

The respond module 208 is configured with following functionalities: (a) Configuration, network Slicing, network Virtualization, Power control, Route selection, etc., (related to network and protocols), and (b) Deals with Layer-1 (PHYSICAL layer) to Layer-4 (Transport Layer) network parameters of Transmission Control Protocol and the Internet Protocol (TCP/IP) protocol Stack which can be shared with the application for cross-layer application optimization. For Example: Video streaming rate adaption based on link capacity or load in the network.

The respond module 208 comprises with: (a) decision translator for understanding the decisions and calling appropriate control logic; (b) network, application and protocol control; (c) cognitive control i.e. the respond module which decides what to be configured; (d) APS (Adaptable Prioritization and Segregation) i.e. traffic prioritization and congestion control at application layer; and (e) probe manager i.e. what is to be probed based on the message received from the analysis/decide module.

Figure 2:
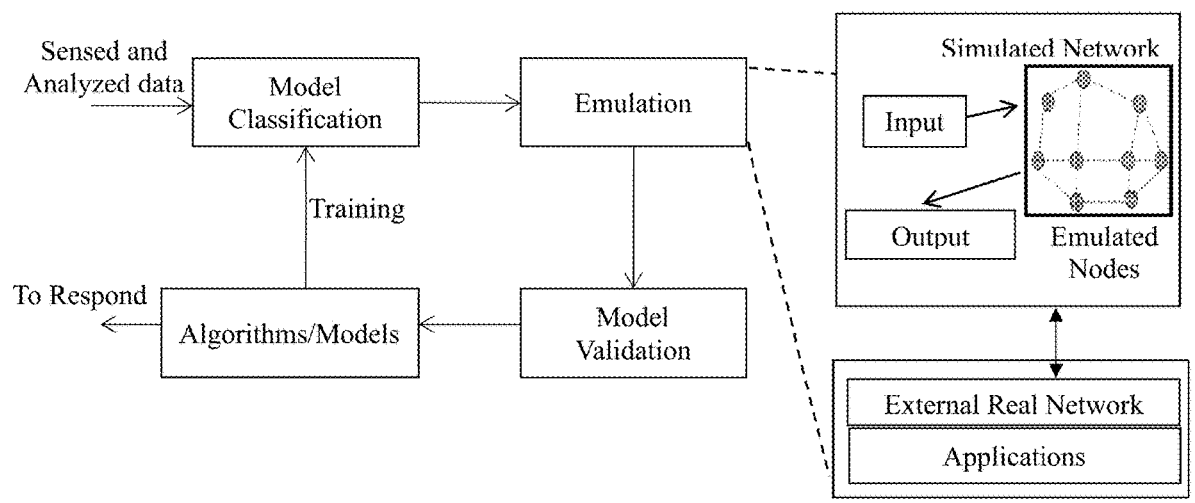
FIG. 2 illustrates an exploded view of the Decide module in the SADR framework, according to embodiments of the present disclosure.

FIG. 2 illustrates an exploded view of the decide module 206 in the SADR framework, according to embodiments of the present disclosure. In an embodiment, the data is collected by the sense module 202 and is analyzed by the analyze module 204 which gets fed to the decide module 206. The decide module 206 further includes a model classification module followed by a simulation or an emulation module, and model validation module. In an embodiment, an emulation supports in checking at least one of i.e., (i) one or more scenario (e.g., network and application), (ii) throughput, (iii) existing rules and methods and in generating new rules or algorithms. In an embodiment, the new rules or algorithms are to be validated by a model validation module and are passed to an algorithms/models module. The input from one or more algorithms/models to model classification which support in checking the analyzed data with the one or more existing rules or algorithms. The emulation and the model validation is configured in creating new rules or adding new rules, which are essential for the respond module 208.

Figure 3:
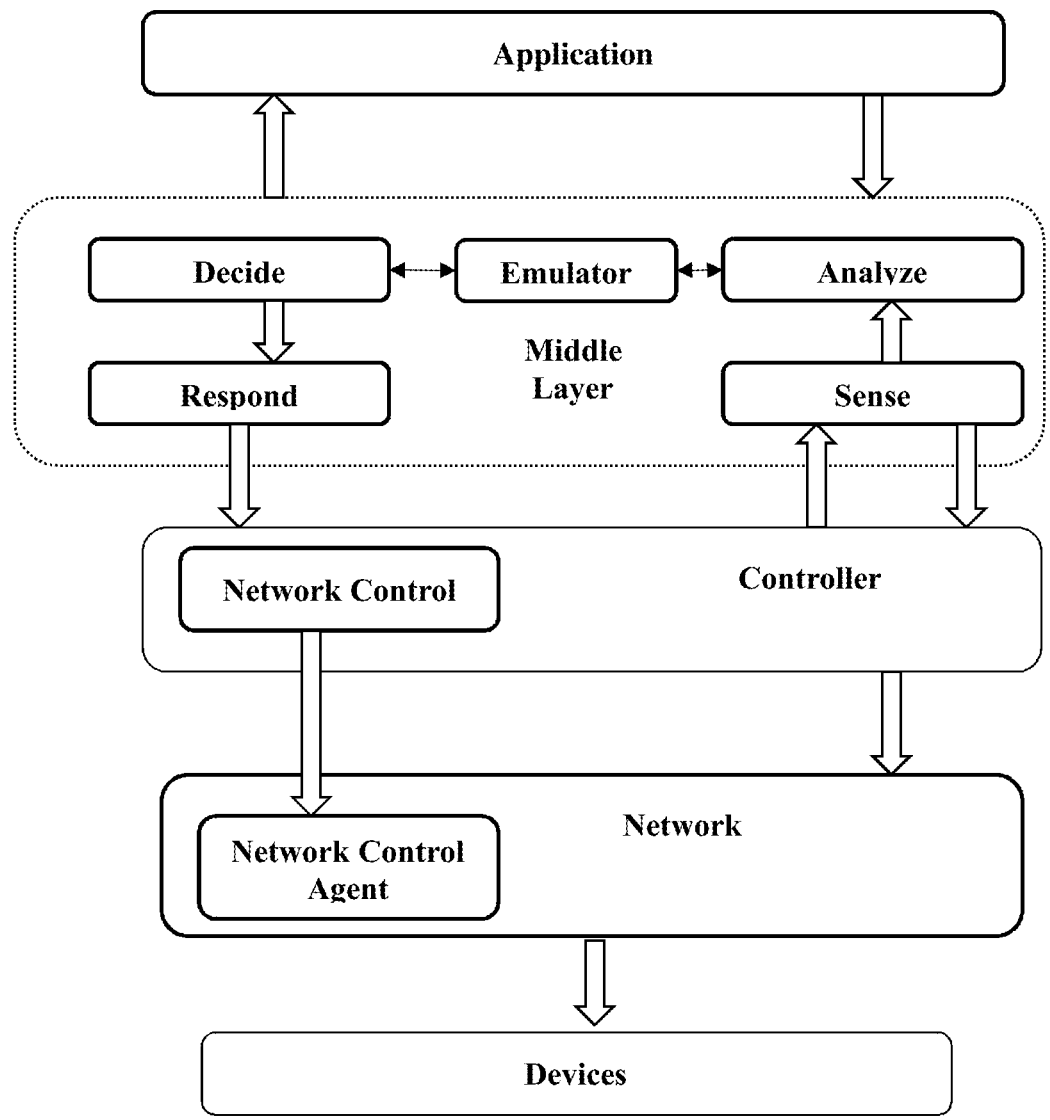
FIG. 3 illustrates the SADR framework that may deployed using a middle layer according to embodiments of the present disclosure.

FIG. 3, illustrates the SADR framework that may be deployed using a middle layer by placing logically between the network and the application, according to embodiments of the present disclosure. In an embodiment, the middle layer components comprises at least one of: (a) data store module that stores state information, requests, devices information, policy etc.; (b) core module that provides services to applications and translation to low device level operations; (c) monitor module that monitors the devices, network, topology, statistics collection etc.; (d) QoS Module is configured to perform path provisioning, traffic engineering, policy management etc.; (e) Virtualization Module for Virtualization of devices, Network Functions Virtualization (NFV); (f) Infra assistant for device configurations and states via OF-CONFIG or other protocols; and (g) Network Assistant for Network services e.g., provisioning, fault tolerance, Layer 2 or Data Link Layer & Layer 3 or Network Layer (of TCP/IP Protocol Stack) services, and handovers.

Figure 4:
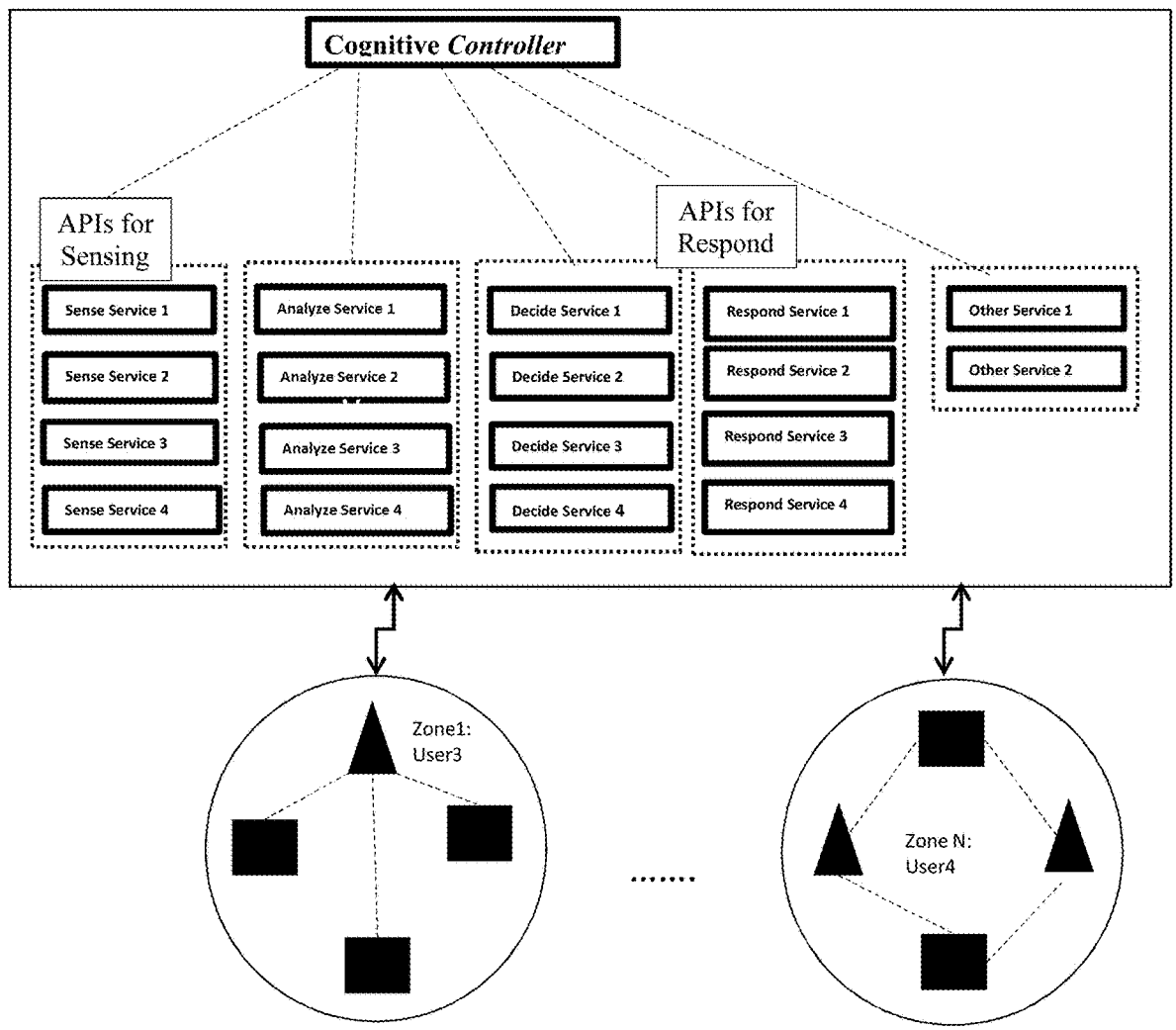
FIG. 4 is a block diagram illustrates an exemplary deployment model of the SADR framework, according to embodiments of the present disclosure.

FIG. 4 is a block diagram illustrates an exemplary deployment model of the SADR framework, according to embodiments of the present disclosure. In an embodiment, each module (Sense, Analyze, Decide and Respond) includes a set of services. For example, one or more services can run independently in any computer (or computer systems), wherein the analyze and the decide services need not require any kind of interface support with the deployed network, whereas the sense and the respond services require appropriate interface support (Application Programming Interfaces (APIs) for sensing and respond) for normal operations. In an embodiment, these can be also handled with the SDNized approach in some cases. In an embodiment, one or more services run through a direct supervision of a central controller or a cognitive controller.

Figure 5:
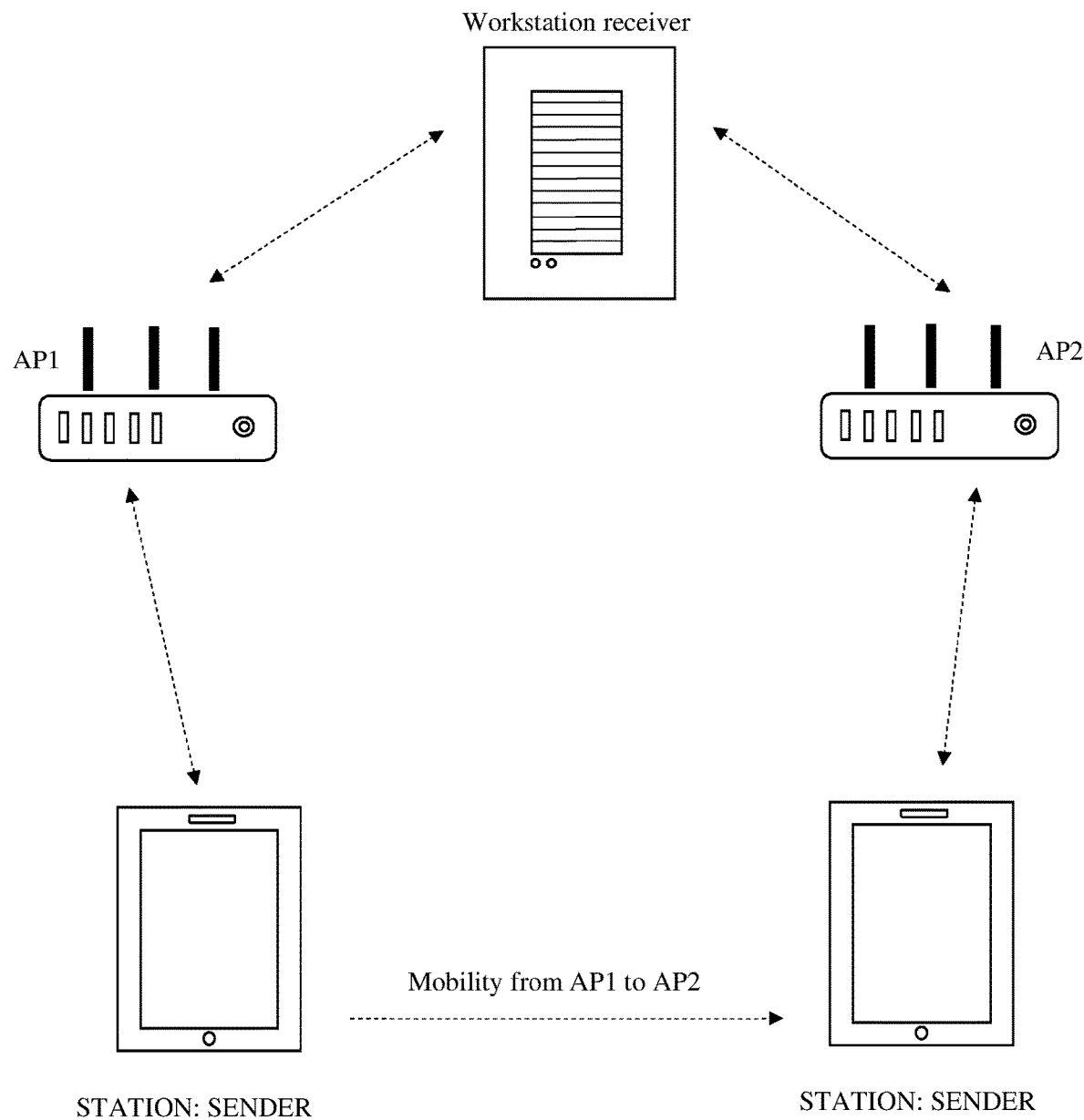
FIG. 5 is a conventional non-SADR experimental set up with a plurality of access points (AP) and a plurality of work stations.

FIG. 5 illustrates a conventional non-SADR experimental setup with two Access Points (AP1 and AP2), one sender device (mobile phone) and one Receiver device (workstation). A sender sends a video using regular HyperText Transfer Protocol (HTTP) streaming to the receiver. While sending, the sender moves from one place to other resulting in change in RSSI values received from access points and subsequently handoff from AP1 to AP2. The handoff can be triggered by the sender using the conventional mechanism.

Figure 6:
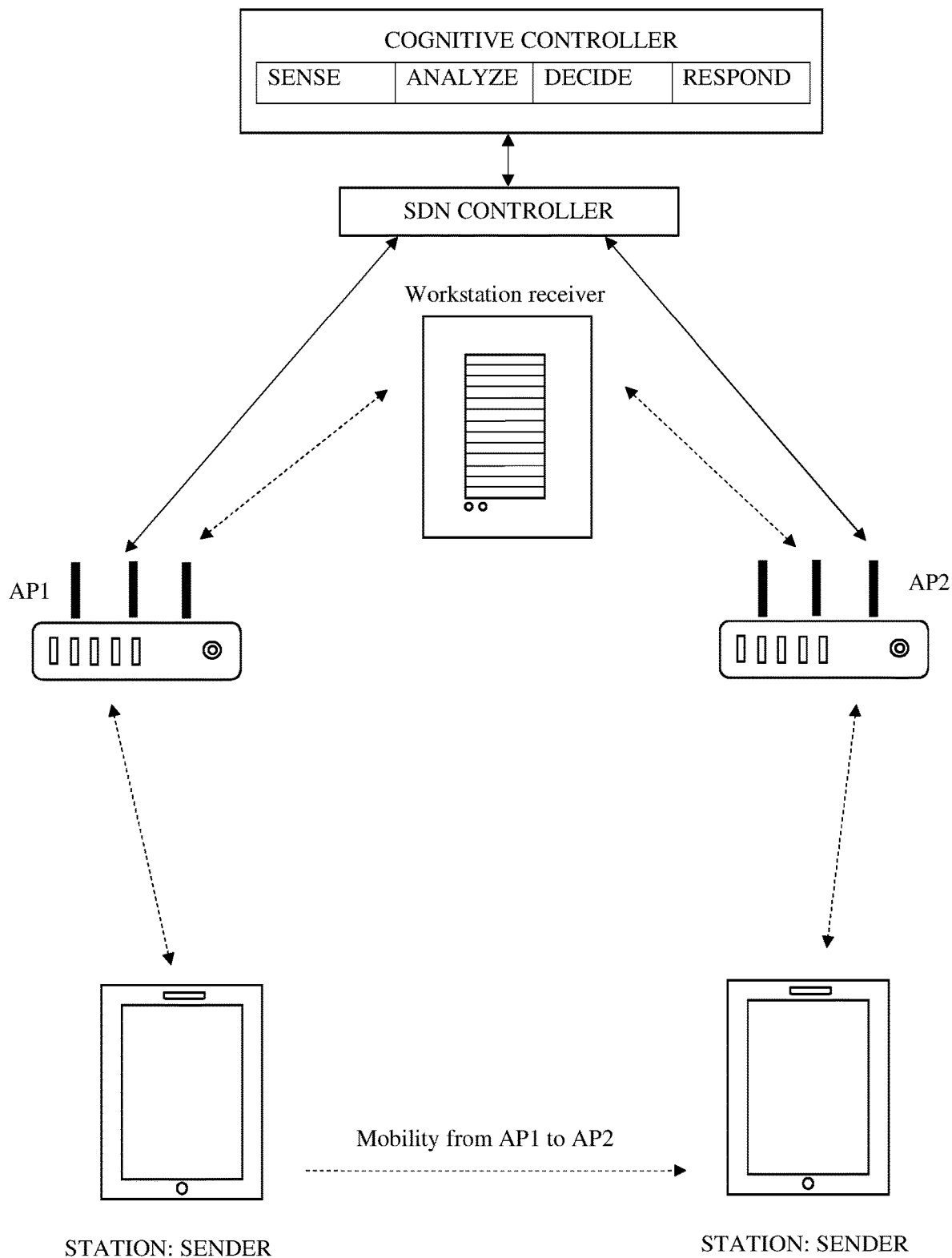
FIG. 6 illustrates an experimental setup of the SADR framework based networking in accordance with embodiments of the present disclosure.

FIG. 6 illustrates an experimental setup of the SADR framework based networking in accordance with embodiments of the present disclosure. For example, consider a simple experiment with two Access Points (AP1 and AP2), one sender device (mobile phone) and one Receiver device (workstation). A sender sends a video using regular Hyper-Text Transfer Protocol (HTTP) streaming to the receiver. While sending, the sender moves from one place to other resulting in change in the RSSI values received from the access points and subsequently handoff from AP1 to AP2. The handoff can be triggered by the cognitive controller— brain with the support of the SADR (Sense, Analyze, Decide and Respond) services and the SDN controller, resulting in smooth handoff.

Figure 7:
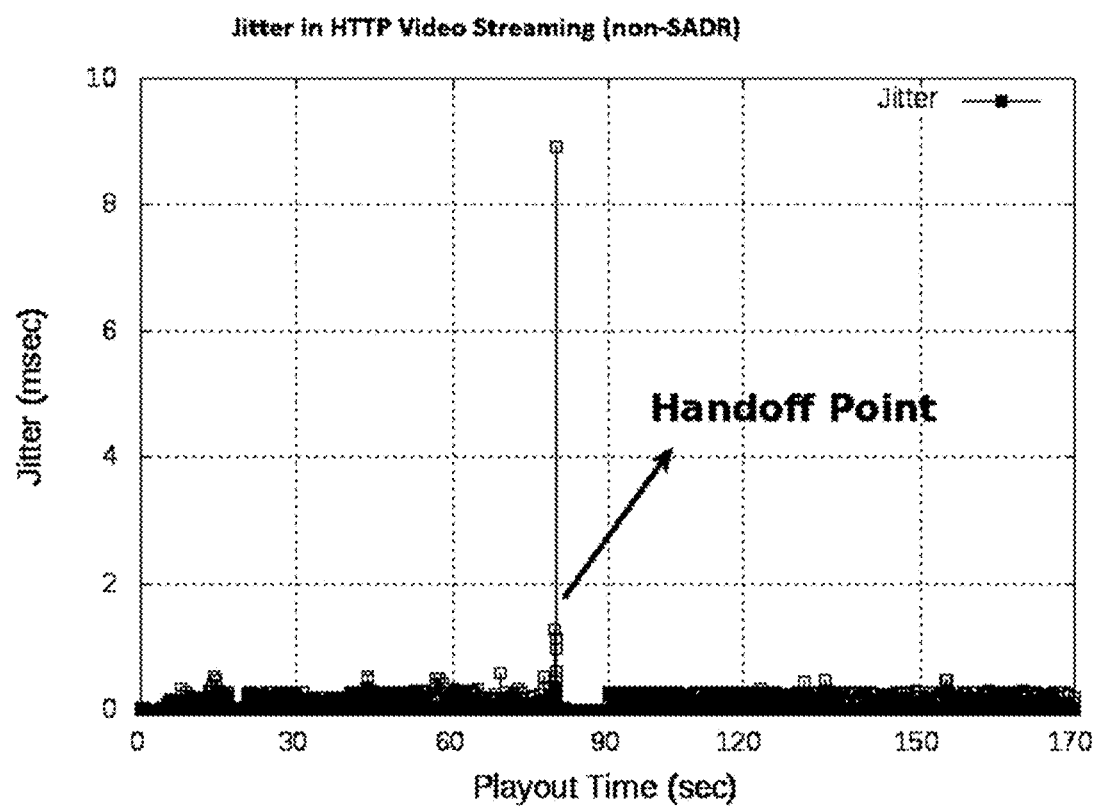
FIG. 7 is a graphical representation that illustrates an experimental results by the conventional experimental setup with significant delay and packet drop before handoff.

FIG. 7 is a graphical representation that illustrates the experimental results by the conventional experimental setup with significant delay and packet drop before handoff.

Figure 8:
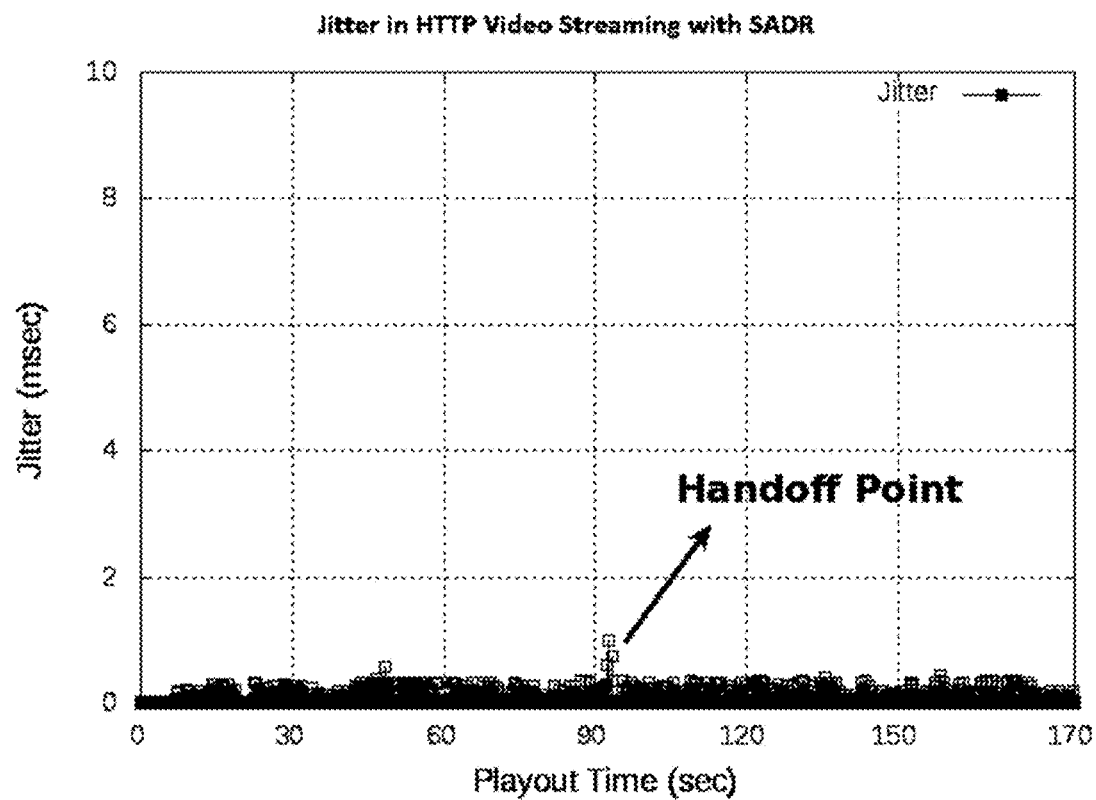
FIG. 8 is a graphical representation that illustrates an experimental results by deploying the SADR framework according to embodiments of the present disclosure.

FIG. 8 is a graphical representation that illustrates the experimental results by deploying the SADR framework according to embodiments of the present disclosure. For example, an effect of smooth handoff is shown. The SADR framework ensures less jitter and packet drops, and seamless handoff.

Figure 9:
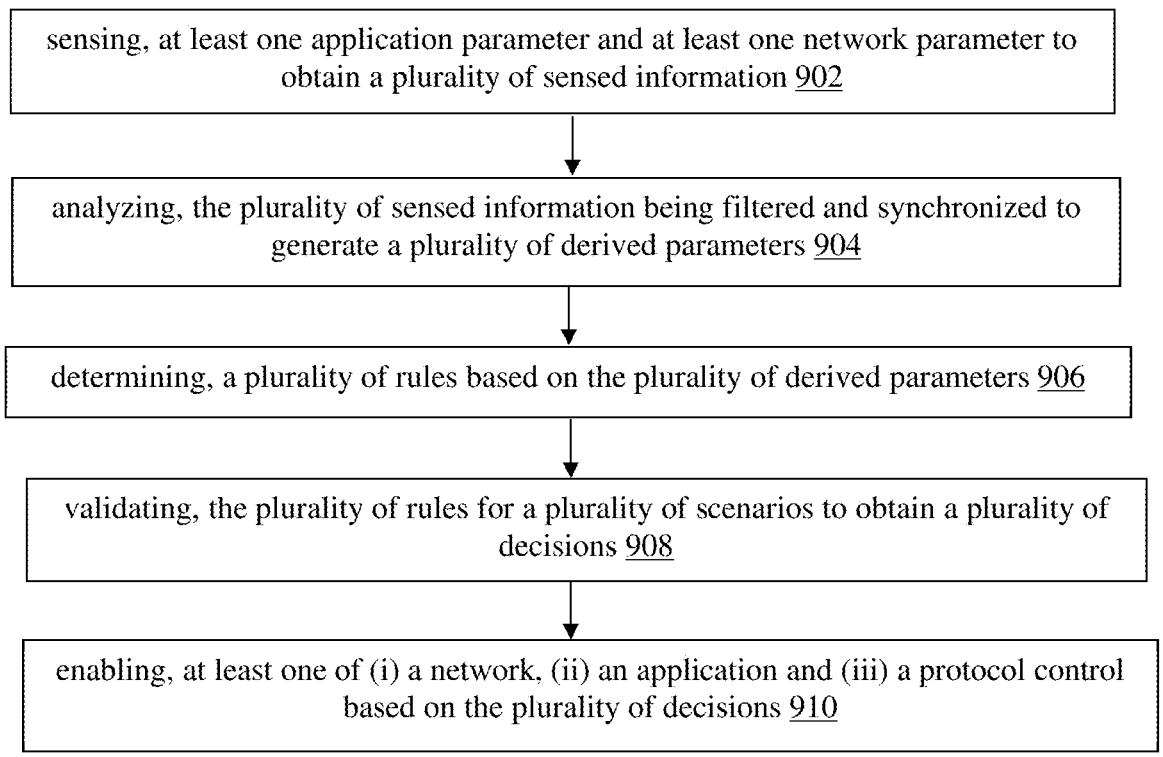
FIG. 9 is a flow diagram illustrating a method for enabling network aware applications and applications aware networks by a sense analyze decide respond (SADR) framework according to embodiments of the present disclosure.

FIG. 9 is a flow diagram illustrating a method for enabling network aware applications and applications aware networks by a sense analyze decide respond (SADR) framework according to embodiments of the present disclosure. The method includes one or more following steps i.e., at step 902, at least one application parameter and at least one network parameter is sensed to obtain a plurality of sensed information. At step 904, the plurality of sensed information is analyzed being filtered and synchronized to generate a plurality of derived parameters. At step 906, a plurality of rules is determined based on the plurality of derived parameters. At step 908, the plurality of rules for a plurality of scenarios is validated to obtain a plurality of decisions. At step 910, at least one of (i) a network, (ii) an application and (iii) a protocol control is enabled based on the plurality of decisions. The plurality of sensed information is a multi-time scaled data set obtained for a plurality of use cases. The plurality of decisions correspond to a real-time decision or an off-line decision.

In an embodiment, the at least one application parameter may correspond to at least one of: (i) one or more Quality of Service (QOS) parameters, and (ii) one or more Key Performance Index (KPI) parameters. In an embodiment, the at least one network parameter may correspond to at least one of (i) bandwidth availability and usage, (ii) a plurality of delay characteristics, (iii) a port availability at a switch, (iv) a end-to-end network availability, (v) a signal to interference and noise ratio (SINR) or received signal strength indicator (RSSI), and (vi) a plurality of protocol related parameters. Further, future state of the networks and the applications may be predicted based on a current sensed data.

The embodiments of present disclosure herein addresses unresolved problem related to indoor, outdoor and hybrid network scenario: (a) Network probing, analysis, seamless and intelligent provisioning and management from application layer; (b) Framework for real-time network provisioning and slicing for low-latency communication; (c) Framework for application layer specific solution to manage both the application as well as lower layer protocols; (d) Framework which realizes network-aware applications and application-aware networking; (e) Framework for real-time decision making based on parameters/decision rules of a joint emulated system of applications, protocols and networks and the observed QoS parameters; and (f) Multidimensional fuzzy classification of network state and emulated network mapping to improve the QoE of the applications.

In the implementation of present disclosure and corresponding methods and systems, the application may be flexible to run in different networks and devices i.e., applications may be configurable based on external factors. Similarly, the networks may be flexible, scalable and easily configurable i.e., network should be configurable based on external factors.

In one embodiment, the adaptive solution requires at least one of:
   (a) Understanding the applications/use cases
      i. QoS guarantee, compute and communication issues.
   (b) Understanding the network
      i. Kind of network, protocols, controllability of the network and protocols;
      ii. Real-time behavior of the network and protocols;
      iii. Capability of the underlying elements.
   (c) Taking a decision
      i. Based on the application requirement and network behavior;
      ii. Can be real-time or off-line.
   (d) Deploying the decision
      i. Fine tuning the application, controlling the protocols and provisioning the network;
      ii. Deciding the optimal deployment decision based on optimization.

Network-Aware Applications
   (i) Application parameters can be decided based on the service definition;
   (ii) Real-time application parameters can be tuned based on the network data;
   (iii) Device data also plays a role e.g., Telematic, sensed and synthetic data have different QoS requirements;
   (iv) Application layer protocol should be interfaced with the cross layer data, i.e., the feedback obtained from lower layers of the TCP/IP protocol stack.

Application-Aware Networking

Network provisioning can be performed based on the application parameters. For example, network provisioning includes scheduling, path selection, routing, congestion control, power control, interference management;

The embodiment, thus provides a unique cognitive framework which works on a top-to-bottom approach on the TCP/IP protocol stack. The embodiment is a middle layer framework which can be agnostic to networks, technology protocol and applications. Moreover, the embodiments herein further provide real-time adaptive decision making based on parameters/decision rules of a joint emulated system of applications, protocols, and networks and the observed QoS parameters. These decision rules can be used to respond certain changes required by the applications, protocols and the networks.

The embodiment provides an SDNized framework which frames network-aware applications or application-aware networking. The embodiment provides a framework, where cross layer feedback is used to tune the applications, protocols and the network through the middle layer. The embodiment provides multi-dimensional classification of the sensed data through analyze module in terms of throughout, delay and reliability independently and/or in combination.

The architecture(s), system as described in the present disclosure is a high level framework which can be used for robotics as well as drone based applications, where sensing can be performed by robots or drones and the sensed data can be communicated over the constrained network or over 5G type network (Wi-Fi or LTE or LTE-Advanced or similar) to a central platform where analysis, and decide modules operate. Based on need of the applications and network, appropriate actuation commands are to be passed to the drones or robots (telematic data) while appropriate network provisioning in terms of handoff, end-to-end bandwidth management or slicing, etc., are passed to the underlying networks through the SDNized framework.

In an embodiment, the Sense Analyze Decide Respond (SADR) framework comprises at least one of key features:
  a) Real-time sensing of network, application and protocols;
  b) Analyzing and learning of features, patterns;
    i. Multi-dimensional network state mapping,
    ii. Optimal decision process through emulation,
    iii. Cognitive/Rule-based network prediction and provisioning;
  c) Middle layer solution.

Further, the SADR framework provides at least one of the following:
  a) Auto sensing, analyzing, prediction and configuration;
  b) Cognitive control of network and protocol;
    i. Vendor and technology agnostic solution,
    ii. Support for 5G and Information Centric Networking (ICN).

Further, the SADR framework provides one or more advantages in application/use cases: (a) Automatic network health monitoring & management—no manual intervention; (b) Customized network to achieve application requirements; (c) Quick recovery from failures. The complete framework can be used for network and service offering for warehouses, but are not limited to factory automations, robotic deployments for rescue operation, real-time video communication, 5G application aware network slicing etc. The SADR framework provides end-to-end orchestration. The SADR framework provides multi-domain service orchestration: spanning across admins, operators and user domains; Automated analytics and end-to-end FCAPS (fault, configuration, accounting, performance and security) support; Heterogeneous network and application support; Self-aware, self-healing, self-management, and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for enabling network aware applications and applications aware networks by a sense analyze decide respond (SADR) framework, comprising:
sensing, via one or more hardware processors, at least one application parameter and at least one network parameter to obtain a plurality of sensed information, wherein the plurality of sensed information is a multi-time scaled data set obtained for a plurality of use cases;
analyzing, via the one or more hardware processors, the plurality of sensed information being filtered and synchronized to generate a plurality of derived parameters, wherein analyzing is performed through a middle layer placed between a network controller and an application and wherein the middle layer comprises at least one of: (a) data store module executed by the hardware processor to store state information, requests, devices information, policy; (b) core module executed by the hardware processor to provide services to applications and translation to low device level operations; (c) monitor module executed by the hardware processor to monitor devices, network, topology, statistics collection; (d) Quality of Service Module executed by the hardware processor configured to perform path provisioning, traffic engineering, policy management; (e) Virtualization Module executed by the hardware processor for Virtualization of devices, Network Functions Virtualization (NFV); (f) Infra assistant for device configurations and states; and (g) network assistant for network services;
determining, via the one or more hardware processors, a plurality of rules based on the plurality of derived parameters;
validating, via the one or more hardware processors, the plurality of rules for a plurality of scenarios to obtain a plurality of decisions, wherein the plurality of decisions correspond to a real-time decision or an off-line decision and wherein the validation is performed by an emulator based testing and wherein the sensed information and synthetic data generated by emulation are used for modeling, training and decision making and wherein the emulator is configured to check at least one of (i) one or more scenario, (ii) throughput, (iii) existing rules and methods and generation of new rules or algorithms; and
enabling, via the one or more hardware processors, at least one of (i) a network, (ii) an application and (iii) a protocol control based on the plurality of decisions.

2. The processor implemented method of claim 1, wherein the at least one application parameter corresponds to at least one of: (i) a plurality of Quality of Service (QOS) parameters, and (ii) a plurality of Key Performance Index (KPI) parameters.

3. The processor implemented method of claim 1, wherein the at least one network parameter corresponds to at least one of (i) bandwidth availability and usage, (ii) a plurality of delay characteristics, (iii) a port availability at a switch, (iv) an end-to-end network availability, (v) a signal to interference and noise ratio (SINR) or received signal strength indicator (RSSI), and (vi) a plurality of protocol related parameters.

4. The processor implemented method of claim 1, further comprising predicting subsequent state of the networks and the applications based on a current sensed data.

5. A sense analyze decide respond (SADR) system (100) with a cognitive platform to enable network aware applications and applications aware networks, comprising:
a memory (102) storing instructions;
one or more communication interfaces (104); and
one or more hardware processors (106) coupled to the memory (102) via the one or more communication interfaces (104), wherein the one or more hardware processors (106) are configured by the instructions to:
sense, at least one application parameter and at least one network parameter to obtain a plurality of sensed information, wherein the plurality of sensed information is a multi-time scaled data set obtained for a plurality of use cases;
analyze, the plurality of sensed information being filtered and synchronized to generate a plurality of derived parameters, wherein analyzing is performed through a middle layer placed between a network controller and an application and wherein the middle layer comprises at least one of: (a) data store module executed by the hardware processor to store state information, requests, devices information, policy; (b) core module executed by the hardware processor to provide services to applications and translation to low device level operations; (c) monitor module executed by the hardware processor to monitor devices, network, topology, statistics collection; (d) Quality of Service Module executed by the hardware processor configured to perform path provisioning, traffic engineering, policy management; (e) Virtualization Module executed by the hardware processor for Virtualization of devices, Network Functions Virtualization (NFV); (f) Infra assistant for device configurations and states; and (g) network assistant for network services;
determine, a plurality of rules based on the plurality of derived parameters;
validate, the plurality of rules for a plurality of scenarios to obtain a plurality of decisions, wherein the plurality of decisions correspond to a real-time decision or an off-line decision and wherein the validation is performed by an emulator based testing and wherein the sensed information and synthetic data generated by emulation are used for modeling, training and decision making and wherein the emulator is configured to check at least one of (i) one or more scenario, (ii) throughput, (iii) existing rules and methods and generate new rules or algorithms; and
enable, at least one of (i) a network, (ii) an application and (iii) a protocol control based on the plurality of decisions.

6. The SADR system of claim 5, wherein the at least one application parameter corresponds to at least one of: (i) a plurality of Quality of Service (QOS) parameters, and (ii) a plurality of Key Performance Index (KPI) parameters.

7. The SADR system of claim 5, wherein the at least one network parameter corresponds to at least one of (i) bandwidth availability and usage, (ii) plurality of delay characteristics, (iii) a port availability at a switch, (iv) an end-to-end network availability, (v) a signal to interference and noise ratio (SINR) or received signal strength indicator (RSSI), and (vi) a plurality of protocol related parameters.

8. The SADR system of claim 5, wherein the one or more hardware processors (106) are further configured by the instructions to predict subsequent state of the networks and applications based on a current sensed data.

* * * * *